Jan. 26, 1965   E. F. LEWIS   3,167,336
FASTENING MEANS
Filed June 18, 1962
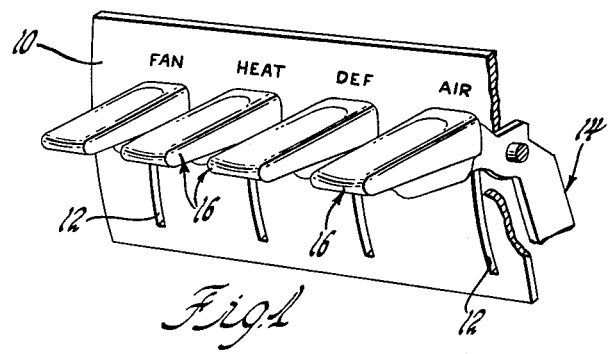
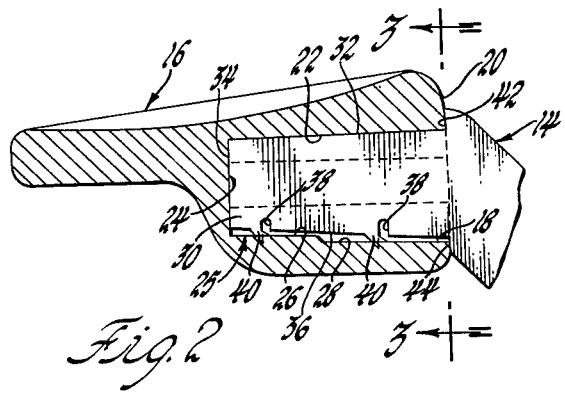
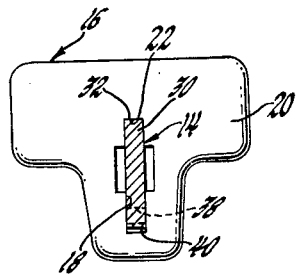
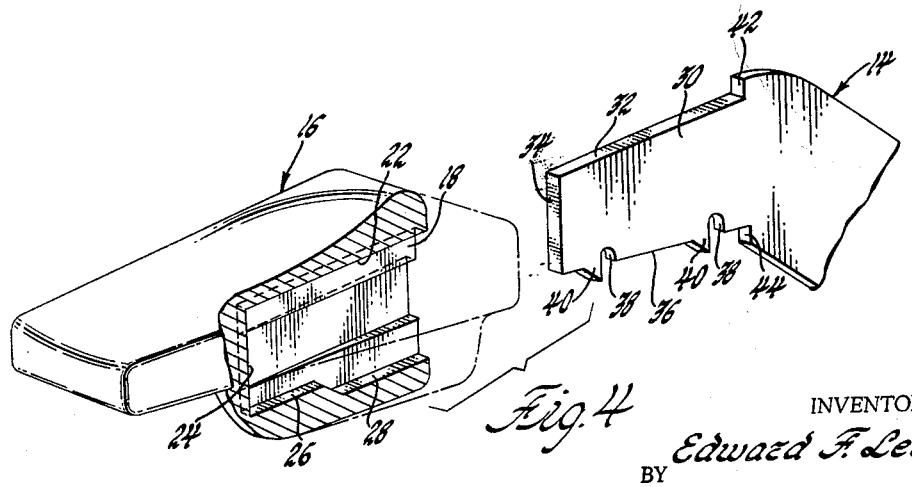
INVENTOR.
Edward F. Lewis
BY
George A. Schmidt
ATTORNEY

# United States Patent Office 3,167,336
Patented Jan. 26, 1965

3,167,336
FASTENING MEANS
Edward F. Lewis, Newfane, N.Y., assignor to General Motors Corporation, Detroit, Mich., a corporation of Delaware
Filed June 18, 1962, Ser. No. 203,297
3 Claims. (Cl. 287—53)

This invention relates to fastening means and, more particularly, to a means for securing one object in another.

In the design and assembly of many articles of manufacture it is necessary to secure one object within or into another. A typical example of such construction is the securing of a control knob to the end of an actuating member on a device such as a vehicle heater. The knob is generally an ornamental device provided with an opening of some sort at the rear end thereof, and a lever which actuates some part of the heater mechanism is received in the opening in the knob. Obviously, for aesthetic purposes the fastening must take place within or behind the control knob where it will not be visible to the operator or passengers of the vehicle.

In such installations it has been the practice in the past to jam or otherwise wedge the knob on the control lever. This has been accomplished by means of controlled dimensions on the lever and in the opening. This requires extremely close tolerances of the various parts and precision manufacturing practices, making the assembly problems very difficult. Slightly oversized or undersized parts or openings means the scrapping of parts and the resultant loss in time and expense.

Another well known method of securing such parts together is to use a separate sheet metal fastening device between the control lever and the control knob. This, of course, is an expensive proposition and requires a third piece to be added to the assembly.

Either of these methods of assembly generally require a great deal of pressure to assemble one part on the other for the proper securement. This may require special tools or machinery which would be complicated and expensive in nature. All of these problems lead directly to the unnecessary expense and poor efficiency in the manufacture and assembly process.

The device in which this invention is embodied comprises, generally, a means for securing one object in another, such as a lever secured in a control knob, whereby the lever is provided with barbs which are bendable into a recess adjacent the barb to take up any extreme interference when the lever end is inserted in the knob. The barbs are of sufficient length to accommodate a great range of tolerances thus eliminating the scrapping and expense problem. This construction permits inexpensive manufacture of the various parts. For example, the knob may be suitably die cast and the lever may be stamped, both of which operations are relatively inexpensive and efficient. Tolerances may be greater, thus decreasing the required control on the manufacture of the various parts.

These and other advantages will become more apparent from the following description and drawings, in which:

FIGURE 1 is a perspective view of a typical installation wherein control knobs are secured to actuating levers of a heater or the like;

FIGURE 2 is a view with parts broken away and in section of the control knob and lever of FIGURE 1, illustrating the purpose of the various parts;

FIGURE 3 is a view partially in section of the assembly of FIGURE 2, taken substantially along the line 3—3 of FIGURE 2 and looking in the direction of the arrows; and FIGURE 4 is an expanded perspective view of the assembly illustrated in FIGURES 2 and 3, illustrating the various parts.

Referring more particularly to the drawings, FIGURE 1 illustrates a typical installation where one object is secured in another. FIGURE 1 illustrates a vehicle heater control panel having a plate 10 with a number of slots 12 formed therein to receive and permit movement of actuating levers 14. Knobs 16 are secured on the levers in a manner to be later described. It is obvious that from an aesthetic standpoint the connection and securement between the levers 14 and knobs 16 must be hidden from the view of the observer.

The control knob, illustrated generally by the numeral 16, may be formed by die casting or by any other suitable method and is provided with a slot 18 extending inwardly from the rear wall 20 thereof. Slot 18 has a generally axial wall 22 and a transverse end wall 24 at the upper and end portions thereof. The lower wall 25 of the slot 18 is such as to provide a decreasing dimension of the slot inwardly of the end surface 20 of the knob 16. This may be accomplished by means of a smooth tapered or inclined wall, or may be accomplished by the manner shown in FIGURE 2 wherein the bottom wall is stepped, having portions 26 and 28. The slot 18 may be of any suitable cross-sectional configuration but it is preferred that the slot be of generally the same cross-sectional configuration as that of the lever 14 which is to be inserted therein. To this end, the cross-section of slot 18 is illustrated as being rectangular.

Lever member 14 is provided at one end, not shown, with a suitable connection for whatever element the lever is to control. The opposite end is provided with an extension 30 which is generally of the same cross-sectional configuration as that of the slot 18. This is true in both axial and transverse plans. That is, extension 30 is provided with a generally axial upper wall 32 and a transverse end wall 34. The bottom wall 36 is inclined so that the extension 30 has a decreasing dimension in a direction away from the body of the lever 14. Thus, the extension with its decreasing dimension and the slot 18 with its decreasing dimension are substantially similarly shaped.

Formed in the bottom wall 36 of the extension 30 of the lever 14 are a plurality of recesses 38. Recesses 38 are in the form of slots or grooves transverse of the extension 30, and are spaced along the length of the wall 36. Adjacent the recesses 38 are barbs 40, the number depending on the number of recesses in the extension 30. Barbs 40 extend outwardly of the extension 30 and increase the dimension of the extension 30 at those points to a dimension greater than the associated dimension of the slot 18. This will become more apparent hereinafter. It is not necessary that extension 30 be provided with two, or only two, barbs. Although this is preferred, the use of a single barb and recess would operate just as well. Similarly, more than two barbs and recesses might be employed.

Lever 14 adjacent the extension 30 is provided with shoulders 42 and 44 which provide a means for limiting the inward travel of the extension 30 in the control knob 16. Any other suitable stop means may be applied.

Upon assembly of the actuating lever 14 with the knob 16 the extension is started in the slot 18 at the opening in the end wall 20 of the knob 16. At this point the dimension of the extension along with the front barb 40 clears the walls 22 and 28 of the slot 18 to permit unimpeded travel. As the extension is advanced inwardly into the slot 18 the front barb 40 and the rear barb, if used, contact the appropriate steps 26 and 28 of the lower wall 25 of the slot 18. This contact may take place after a substantial portion of the travel for ease in assembly. The barbs 40 bend as the interference with the lower wall of the slot 18 increases and, depending on the tolerances and space between the extension 30 and the lower wall 25 of the slot 18, the barbs bend a sufficient amount to securely and positively wedge the lever 14 and knob 16. If the interference is excessive or the distance between the two parts is too close, the barbs 40 are permitted to bend partially into the recesses 38 adjacent thereto for positive engagement. The lever 14 is forced into the knob 16 until the stop means 42 and 44 engage the end wall 20 of the knob 16 and prevent further travel. Because of the barbs 40 deforming within the slot 18 it is extremely difficult to remove the extension 30 from the slot 18. Thus, the securement is positive.

Thus, a fastening means is provided which securely fastens one object within another without the use of separate fastening means or without precision manufacture of the various parts. This securement is positive and of sufficient simplicity to provide an efficient method of assembly.

What is claimed is:

1. Means for securing a knob to an actuating lever and comprising:
    a knob having a stepped slot formed therein opening at one end thereof, said stepped slot having two portions of different size, the larger portion of said two portions of said slot being adjacent the opening thereof;
    a lever having a tapered extension formed on one end thereof, said extension being received in said slot in said knob, and said extension having spaced recesses formed therein, one of said recesses overlying each of said portions of said stepped slot;
    and barbs formed on said extension adjacent each of said recesses, said barbs extending beyond the edge of said extension to interfere with the wall of said slot in said knob, said barbs being bendable in a direction opposite to the direction of insertion of said lever extension into said slot and adapted to bend partially into said recesses when excessive interference exists between said extension and the wall of said slot.

2. The means for securing a knob on an actuating lever set forth in claim 1 wherein said barbs and said adjacent formed on said lever adjacent said extension and adapted to engage said end of said knob to limit the extent of insertion of said extension into said slot.

3. The means for securing a knob on an actuating lever set forth in claim 1 wherein said barbs and said adjacent recesses are spaced from the end of said extension to permit uninterfering insertion of said extension into said slot for a substantial portion of travel.

References Cited in the file of this patent

UNITED STATES PATENTS

| | | |
|---|---|---|
| 624,380 | Rising | May 2, 1899 |
| 2,018,376 | McMenamin | Oct. 22, 1935 |
| 2,069,427 | Stott | Feb. 2, 1937 |
| 2,147,343 | Hokanson | Feb. 14, 1939 |

FOREIGN PATENTS

| | | |
|---|---|---|
| 676,264 | Germany | May 31, 1939 |